(12) United States Patent
Moon et al.

(10) Patent No.: US 12,425,319 B2
(45) Date of Patent: Sep. 23, 2025

(54) METHOD AND SYSTEM FOR EVALUATING SERVICE PERFORMANCE PERCEIVED BY USER

(71) Applicant: LY Corporation, Tokyo (JP)

(72) Inventors: Jiyoon Moon, Seongnam-si (KR); Changdeuk Hwa, Seongnam-si (KR)

(73) Assignee: LY Corporation, Tokyo (JP)

( * ) Notice: Subject to any disclaimer, the term of this patent is extended or adjusted under 35 U.S.C. 154(b) by 40 days.

(21) Appl. No.: 17/986,262

(22) Filed: Nov. 14, 2022

(65) Prior Publication Data
US 2023/0155909 A1 May 18, 2023

(30) Foreign Application Priority Data

Nov. 15, 2021 (KR) .................. 10-2021-0156611

(51) Int. Cl.
| | |
|---|---|
| H04L 43/0852 | (2022.01) |
| H04L 43/091 | (2022.01) |
| G06F 16/958 | (2019.01) |
| G06Q 50/10 | (2012.01) |
| H04L 17/02 | (2006.01) |
| H04L 41/5067 | (2022.01) |
| H04N 21/442 | (2011.01) |

(52) U.S. Cl.
CPC .................. H04L 43/0852 (2013.01)

(58) Field of Classification Search
CPC ............... H04L 43/0852; H04L 43/091; H04L 41/5067; H04N 21/44209; H04N 17/02; G06F 16/972; G06Q 50/10
See application file for complete search history.

(56) References Cited

U.S. PATENT DOCUMENTS

| | | | |
|---|---|---|---|
| 7,277,843 B1 * | 10/2007 | Wen ...................... | H04L 43/16 709/224 |
| 9,600,400 B1 * | 3/2017 | McDowell .......... | G06F 11/3414 |
| 10,713,141 B2 * | 7/2020 | Karunamoorthy .... | G06F 11/302 |

(Continued)

FOREIGN PATENT DOCUMENTS

| | | |
|---|---|---|
| KR | 10-2009-0051609 A | 5/2009 |
| KR | 10-2012-0079513 A | 7/2012 |

(Continued)

OTHER PUBLICATIONS

Korean Office Action dated Sep. 4, 2023 issued in Korean Patent Application No. 10- 2021-0156611.

(Continued)

*Primary Examiner* — Kamal M Hossain
(74) *Attorney, Agent, or Firm* — Harness, Dickey & Pierce, P.L.C.

(57) ABSTRACT

Methods and systems for evaluating a service experience performance of a user may be provided. A method of evaluating a service experience performance may include capturing a screen based on a time unit until a landing image according to a scenario of a service is loaded, determining that loading of the landing image is completed based on the captured screen, deriving an amount of loading time until the loading of the landing image is completed, and indexing performance for the scenario of the service based on the amount of loading time and an evaluation reference time.

17 Claims, 7 Drawing Sheets

| Service | Scenario | Loading time for each section | | Score | Rate of change (%) |
|---|---|---|---|---|---|
| | | Platform(s) | Service(s) | | |
| Service A | Scenario 1 | 1.0 | 2.1 | | 95.2 | -4.5 |
| | Scenario 2 | 0.9 | 3.1 | | 64.5 | 14.8 |
| | Scenario 3 | 0.9 | 4.1 | | 48.8 | 13.9 |
| Service B | Scenario 4 | 0.6 | 1.2 | | 100 | 9.1 |
| | Scenario 5 | 0.3 | 0.8 | | 100 | 14.3 |
| | Scenario 6 | 0.7 | 1.9 | | 100 | 0 |
| Service C | Scenario 7 | - | 1.8 | | 100 | -14.3 |
| Service D | Scenario 8 | 1.0 | 1.6 | | 100 | -5.9 |
| | Scenario 9 | 1.0 | 2.1 | | 95.2 | 5 |
| Service E | Scenario 10 | 0.5 | 3.4 | | 58.8 | -2.9 |
| | Scenario 11 | 0.4 | 4.3 | | 46.5 | -4.4 |
| Service F | Scenario 12 | 1.2 | 3.5 | | 57.1 | 12.9 |
| Service G | Scenario 13 | 1.1 | 2.2 | | 90.9 | 0 |

(56) References Cited

U.S. PATENT DOCUMENTS

| | | | |
|---|---|---|---|
| 2006/0176824 A1* | 8/2006 | Laver | H04L 43/08 |
| | | | 370/231 |
| 2013/0072126 A1* | 3/2013 | Topaltzas | H04W 24/08 |
| | | | 455/67.11 |
| 2013/0121599 A1* | 5/2013 | Shmouely | H04L 67/02 |
| | | | 348/135 |
| 2015/0242148 A1* | 8/2015 | Suzuki | G06F 3/0619 |
| | | | 711/114 |
| 2020/0159866 A1* | 5/2020 | Dong | G06F 16/958 |
| 2022/0131769 A1* | 4/2022 | Dille | H04L 43/04 |
| 2023/0063608 A1* | 3/2023 | Zhuo | G06V 10/74 |

FOREIGN PATENT DOCUMENTS

| | | |
|---|---|---|
| KR | 10-2015-0035151 A | 4/2015 |
| KR | 10-1774359 B1 | 9/2017 |
| KR | 10-1836852 B1 | 3/2018 |
| KR | 10-2019-0024145 A | 7/2019 |

OTHER PUBLICATIONS

Korean Office Action dated Dec. 1, 2023 issued in Korean Patent Application No. 10- 2021-0156611.

\* cited by examiner

| Service | Scenario | Loading time for each section | | | Score | Rate of change (%) |
|---|---|---|---|---|---|---|
| | | Platform(s) | Service(s) | | | |
| Service A | Scenario 1 | 1.0 | 2.1 |  | 95.2 | -4.5 |
| | Scenario 2 | 0.9 | 3.1 |  | 64.5 | 14.8 |
| | Scenario 3 | 0.9 | 4.1 |  | 48.8 | 13.9 |
| Service B | Scenario 4 | 0.6 | 1.2 |  | 100 | 9.1 |
| | Scenario 5 | 0.3 | 0.8 |  | 100 | 14.3 |
| | Scenario 6 | 0.7 | 1.9 |  | 100 | 0 |
| Service C | Scenario 7 | - | 1.8 |  | 100 | -14.3 |
| Service D | Scenario 8 | 1.0 | 1.6 |  | 100 | -5.9 |
| | Scenario 9 | 1.0 | 2.1 |  | 95.2 | 5 |
| Service E | Scenario 10 | 0.5 | 3.4 |  | 58.8 | -2.9 |
| | Scenario 11 | 0.4 | 4.3 |  | 46.5 | -4.4 |
| Service F | Scenario 12 | 1.2 | 3.5 |  | 57.1 | 12.9 |
| Service G | Scenario 13 | 1.1 | 2.2 |  | 90.9 | 0 |

METHOD AND SYSTEM FOR EVALUATING SERVICE PERFORMANCE PERCEIVED BY USER

CROSS-REFERENCE TO RELATED APPLICATION(S)

This U.S. non-provisional application and claims the benefit of priority under 35 U.S.C. § 119 to Korean Patent Application No. 10-2021-0156611, filed Nov. 15, 2021, the entire contents of which are incorporated herein by reference in their entirety.

BACKGROUND

Technical Field

Some example embodiments of the following description relate to methods and/or systems for evaluating a service experience performance of a user.

Related Art

An amount of time required until a screen of a specific online service is loaded may differ depending on a frame that constitutes the corresponding service or screen, a network speed, and performance of a device that loads the screen. To measure the performance of each service, a loading completion point in time of a screen is calculated using an internal message provided from a browser and a system in the art.

However, the internal message provided from the browser and the system exhibits a great difference in terms of a completion point in time of a screen transition actually perceived by a user. In addition, since an environment of the user is not considered for measurement, it is difficult to measure a performance for a part actually perceived by the user.

Also, since measured contents are not indexed, it is not possible to instantly recognize performance differences between difference services.

SUMMARY

Some example embodiments provide methods and/or systems for evaluating a service experience performance that may determine a loading completion of a landing image according to a scenario of a service based on a screen capture, may accurately measure a performance for a part perceived by a user by indexing performance for the scenario of the service based on an amount of loading time until loading of a landing image is completed and an evaluation reference time and may compare performances between different services.

According to an aspect of at least one example embodiment, there is provided a method of evaluating a service experience performance of a computer device including at least one processor. The method may include, by the at least one processor, capturing a screen based on a time unit until a landing image according to a scenario of a service is loaded, determining that loading of the landing image is completed based on the captured screen, deriving an amount of loading time until the loading of the landing image is completed, and indexing performance for the scenario of the service based on the amount of loading time and an evaluation reference time.

The scenario may include a scenario for a transition from a first screen of the service to a second screen of the service, and the landing image may include an image corresponding to the second screen.

The capturing may include capturing a displayed screen of an electronic device of a user included in a real user environment.

The determining that loading of the landing image is completed may include determining that the loading of the landing image is completed when the captured screen corresponds to a desired landing image.

The deriving may include determining a difference between a first time at which the screen corresponding to the desired landing image is captured and a second time at which the scenario of the service starts as the amount of loading time.

The determining that loading of the landing image is completed may include evaluating a change between consecutively captured screens and determining that the loading of the landing image is completed when the change between the consecutively captured screens is absent for a period of time or more.

The deriving may include determining a difference between a first time at which a first screen among the consecutively captured screens without the change is captured and a second time at which the scenario of the service starts as the amount of loading time.

The indexing may include indexing the performance for the scenario of the service based on a value acquired by dividing the evaluation reference time by the amount of loading time.

The indexing may include indexing the performance for the scenario of the service based on a value acquired by dividing the evaluation reference time by the amount of loading time and indexing the performance for the scenario of the service by assigning a highest score to the amount of loading time corresponding to the evaluation reference time or less.

The indexing may include indexing the performance for the scenario of the service by assigning a grade according to a range of a value acquired by dividing the evaluation reference time by the amount of loading time.

The method may further include, calculating, by the at least one processor, an average of indexed performances measured over a plurality of times.

The method may further include applying, by the at least one processor, a variability of the indexed performances measured over the plurality of times to the calculated average.

According to an aspect of at least one example embodiment, there is provided a non-transitory computer-readable recording medium including instructions that, when executed by a processor, cause a computer device to perform the aforementioned method.

According to an aspect of at least one example embodiment, there is provided a computer device including at least one processor configured to execute a computer-readable instruction. The at least one processor is configured to cause the computer device to capture a screen based on a time unit until a landing image according to a scenario of a service is loaded, determine that loading of the landing image is completed based on the captured screen, derive an amount of loading time until the loading of the landing image is completed, and index performance for the scenario of the service based on the amount of loading time and an evaluation reference time.

According to some example embodiments, it is possible to determine a loading completion status of a landing image according to a scenario of a service based on a screen capture, to accurately measure a performance for a part perceived by a user by indexing performance for the scenario of the service based on an amount of loading time until loading of the landing image is completed and an evaluation reference time, and compare performances between different services.

Further areas of applicability will become apparent from the description provided herein. The description and specific examples in this summary are intended for purposes of illustration only and are not intended to limit the scope of the present disclosure.

DETAILED DESCRIPTION

Figure 1:
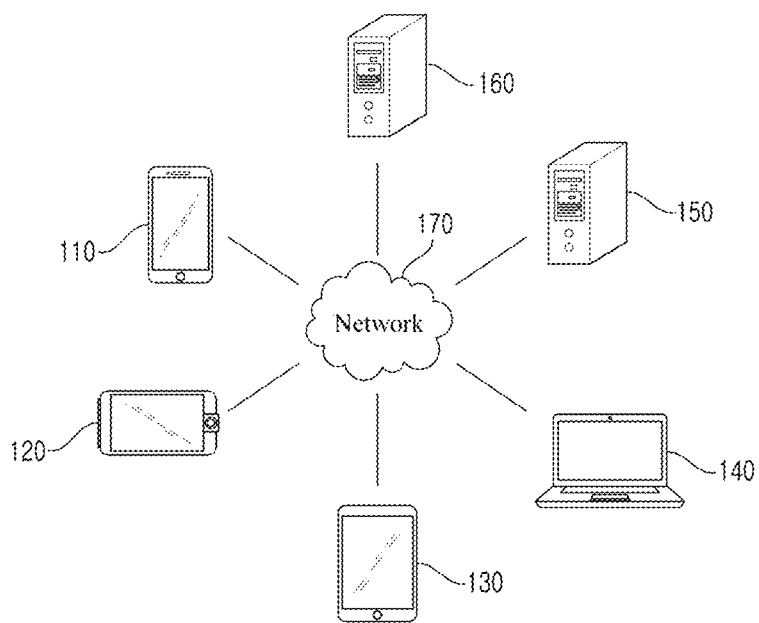
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

A service experience performance evaluation system according to some example embodiments may be implemented by at least one computer device. A service experience performance evaluation method according to some example embodiments may be performed by at least one computer device included in the post providing system. Here, the expression "service experience performance" may represent a service performance perceived by a user. Here, a computer program according to an example embodiment may be installed and run on the computer device and the computer device may perform the service experience performance evaluation method according to at least one of example embodiments under control of the computer program. The aforementioned computer program may be stored in a computer-readable recording medium to implement the service experience performance evaluation method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. Here, examples of the service may include an instant messaging service, a transaction (e.g., a transfer) service, a payment service, a virtual exchange service, a risk monitoring service, a game service, a group call service (or an audio conference service), a messaging service, a mail service, a social network service, a map service, a translation service, a financial service, a search service, and/or a content providing service.

Figure 2:
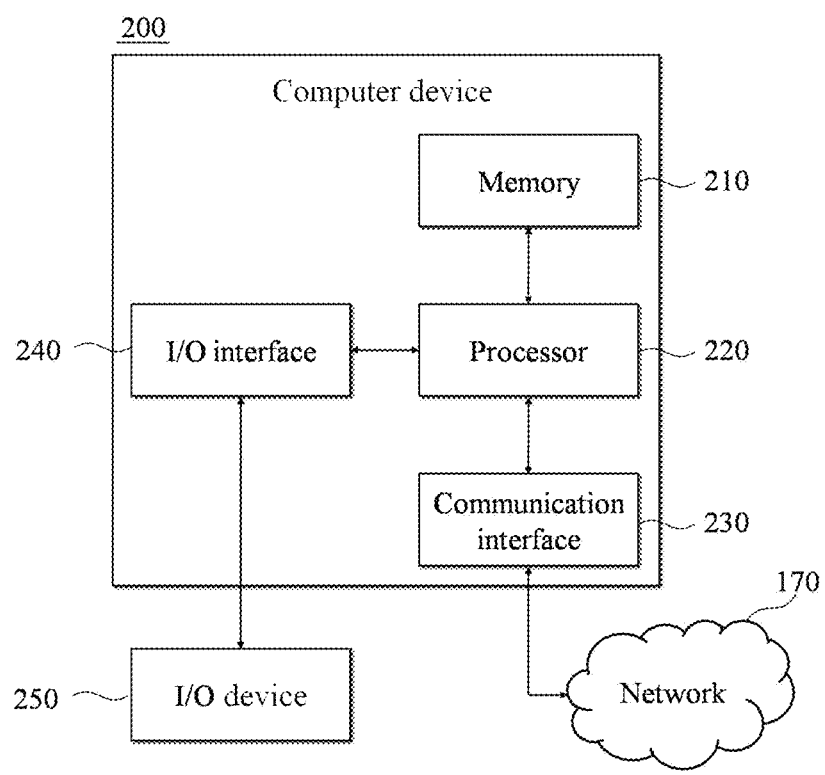
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random-access memory (RAM), a read only memory (ROM), and a disk drive, as a non-transitory computer-readable recording medium. The permanent mass storage device, such as a ROM and a disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, or a memory card. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the communication device 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, a file, etc., received through the communication interface 230 may be forwarded to the processor 220 or the memory 210, and may be stored in a storage medium, for example, the permanent storage device, further includable in the computer device 200.

The I/O interface 240 may be a device used for interfacing with an I/O device 250. For example, an input device may include a device, such as a microphone, a keyboard, and a mouse, and an output device may include a device, such as a display and a speaker. As another example, the I/O interface 240 may be a device for interfacing with an apparatus in which an input function and an output function are integrated into a single function, such as a touchscreen. At least one of the I/O device 250 may be configured as a single apparatus with the computer device 200. For example, the I/O device 250 may be implemented in a form in which a touchscreen, a microphone, a speaker, etc., are included in the computer device 200 (e.g., a smartphone).

Any functional blocks shown in FIG. 2 and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Also, according to other example embodiments, the computer device 200 may include a greater or smaller number of components than the number of components of FIG. 2. However, there is no need to clearly illustrate many conventional components. For example, the computer device 200 may be configured to include at least a portion of the I/O device 250 or may further include other components, such as a transceiver and a database.

Figure 3:
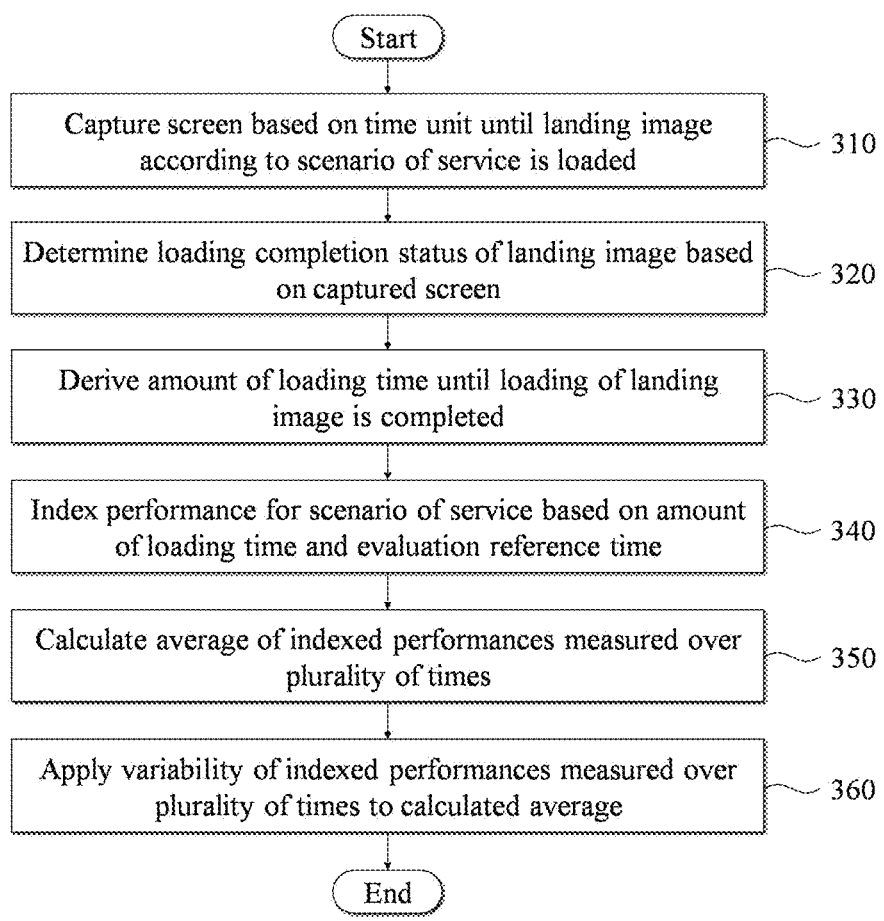
FIG. 3 is a flowchart illustrating an example of a method of evaluating a service experience performance according to at least one example embodiment.

FIG. 3 is a flowchart illustrating an example of a method of evaluating a service experience performance according to at least one example embodiment. The service experience performance evaluation method according to the example embodiment may be performed by the computer device 200 that implements a service experience performance evaluation system. Here, the processor 220 of the computer device 200 may be implemented to execute a control instruction according to a code of at least one computer program or a code of an OS included in the memory 210. Here, the processor 220 may control the computer device 200 to perform operations 310 to 360 included in the method of FIG. 3 according to a control instruction provided from a code stored in the computer device 200.

In operation 310, the computer device 200 may capture a screen based on a desired (or alternatively, preset) time unit until a landing image according to a scenario of a service is loaded.

For example, in response to an input of an instruction according to a scenario of a service, the computer device 200 may capture a screen based on a desired (or alternatively, preset) time unit until a landing image according to the scenario of the service is loaded.

As another example, the computer device 200 may capture a video until a specific condition is met using the computer device 200 or another device electrically connected to the computer device 200 and may capture a screen based on a desired (or alternatively, preset) time unit until a landing image according to a scenario of a service is loaded in the captured video.

Here, the scenario may include a scenario for a transition from a first screen of the service to a second screen of the service, and the landing image may include an image corresponding to the second screen. That is, a transition from a single screen of the service to a target screen may correspond to a single scenario and an image of the target screen may be the landing image according to the scenario of the corresponding service. Here, the transition from the single screen to the target screen may be performed through a single screen transition and may also be performed through a plurality of screen transitions. For example, two screen transitions such as a transition from the first screen to a third screen through the second screen may be configured as a single scenario and three or more screen transitions may be configured as a single scenario. Here, an image of a target screen that is each last screen may be a landing image of the corresponding scenario.

Also, a screen may represent a screen of an electronic device of a user included in an instantly configured or preconfigured real user environment. Here, the instantly configured or preconfigured real user environment or the electronic device of the user may be a real physical environment or a real physical electronic device and may also be a virtual environment or a virtual electronic device. For example, the computer device 200 may be connected to a separate physical electronic device through a wired/wireless network and may receive a screen captured by the electronic device through the wired/wireless network. Here, loading of the landing image may represent that the target screen of the scenario is loaded to the physical electronic device and displayed on a display of the physical electronic device. As another example, the virtual electronic device may be a virtual device implemented in the computer device 200. In this case, the computer device 200 may capture and acquire a virtual screen of the virtual device. Here, loading of the landing image may represent that the target screen of the scenario is loaded to the virtual electronic device and virtually displayed on a display of the virtual electronic device.

Also, the desired (or alternatively, preset) time unit may be appropriately selected not to capture a large number of screens without interfering with accurately measuring an amount of loading time from a start of the scenario to loading of the landing image. For example, 100 ms may be set as the desired (or alternatively, preset) time unit, but it is provided as an example only.

In operation 320, the computer device 200 may determine a loading completion status of the landing image based on the captured screen.

In an example embodiment, the computer device 200 may compare a current captured screen to a desired (or alternatively, preset) landing image and may determine that loading of the landing image is completed when the current captured screen corresponds to the desired (or alternatively, preset) landing image. For example, for the scenario for the transition from the first screen to the second screen, the second screen may be set or preset as the landing image. In this case, every time a screen is captured, the computer device 200 may compare the current captured screen to the desired (or alternatively, preset) landing image and may determine that loading of the landing image is completed when the current captured screen is determined to be a screen corresponding to the desired (or alternatively, preset) landing image.

In another example embodiment, the computer device 200 may evaluate a change between consecutively captured screens among the captured screens and may determine that loading of the landing image is completed when the change between the consecutively captured screens is absent for a desired (or alternatively, preset) period of time or more. For example, considering the scenario for the transition from the first screen of the service to the second screen of the service, there may be no more change in the second screen after the second screen is loaded. Therefore, when screens between which there is no change for a certain period of time or more based on a variance between the captured consecutive screens, the computer device 200 may determine that loading of the landing image is completed.

In operation 330, the computer device 200 may derive an amount of time until loading of the landing image is completed. Here, the desired amount of time may be differently derived according to a method of determining a loading completion status of the landing image.

In an example embodiment, when the computer device 200 compares the current captured screen to the desired (or alternatively, preset) landing image and determines that loading of the landing image is completed, the computer device 200 may determine a difference between a time at which a screen corresponding to the desired (or alternatively, preset) landing image is captured and a time at which the scenario of the service starts, as the amount of loading time. That is, the time at which the screen corresponding to the desired (or alternatively, preset) landing image is captured may be determined as a loading completion time of the landing image.

In another example embodiment, in the case of determining the loading completion status of the landing image depending on whether a change between captured screens is present, the computer device 200 evaluates the change between the captured screens for a desired (or alternatively, preset) period of time from a time at which loading of an actual landing image is completed. Therefore, in this case, the computer device 200 may determine a difference between the time at which the first screen among the consecutively captured screens without the change is captured and a time at which the scenario of the service starts, as the amount of loading time. That is, a time at which a screen corresponding to the landing image is initially captured may be determined as a loading completion time of the landing image.

In some example embodiments, the amount of loading time may be determined as a difference acquired by subtracting a scenario start time from the loading completion time.

In operation 340, the computer device 200 may index performance for the scenario of the service based on the amount of loading time and a desired (or alternatively, preset) evaluation reference time. The same evaluation reference time may be set for all services or all scenarios. However, it is provided as an example only. For example, a different evaluation reference time may be set for each service or a different evaluation reference time may be set for each scenario. Here, for more objective performance evaluation and comparison between services, the same evaluation reference time may be set for all services or all scenarios.

For example, the computer device 200 may index performance for the scenario of the service based on a value acquired by dividing the desired (or alternatively, preset) evaluation reference time by the amount of loading time. As another example, the computer device 200 may index the performance for the scenario of the service based on the value acquired by dividing the desired (or alternatively, preset) evaluation reference time by the amount of loading time and, here, may index the performance for the scenario of the service by assigning a highest score to an amount of loading time corresponding to the desired (or alternatively, preset) evaluation reference time or less. As another example, the computer device 200 may index the performance for the scenario of the service by assigning a grade according to the value acquired by dividing the desired (or alternatively, preset) evaluation reference time by the amount of loading time.

For example, for example, to index the performance as points between 1 and 100, the value acquired by dividing the desired (or alternatively, preset) evaluation reference time by the amount of loading time may be multiplied by 100. Here, 100 may be assigned to the amount of loading time less than or equal to the desired (or alternatively, preset) evaluation reference time. With the assumption that the desired (or alternatively, preset) evaluation reference time is 2 second and the amount of loading time is 2.5 seconds, the performance of the service for the corresponding scenario may be calculated as 80 (2/2.5*100) points. As another example, with the assumption that the desired (or alternatively, preset) evaluation reference time is 2 seconds and the amount of loading time is 4 seconds, the performance of the service for the corresponding scenario may be calculated as 50 (2/4*100) points.

In another example embodiment, the value acquired by multiplying the value acquired by dividing the desired (or alternatively, preset) evaluation reference time by the amount of loading time by 100 may be simply used as the performance as is.

For example, with the assumption that the desired (or alternatively, preset) evaluation reference time is 2 seconds and the amount of loading time is 1 second, the performance of the service for the corresponding scenario may be calculated as 200 (2/1*100) points.

In another example embodiment, the computer device 200 may set, assign, and use a plurality of grades according to the range of the value (or the range of points) acquired by dividing the desired (or alternatively, preset) evaluation reference time by the amount of loading time. For example, the performance of the service for the scenario may be classified into three grades, such as a first grade in a case in which the value (or points) acquired by dividing the desired (or alternatively, preset) evaluation reference time by the amount of loading time is 1 (100 points), a second grade for the range of 0.5 (50 points) to 0.99 (99 points), and a third grade for the range of 0.49 (49 points) or less.

In another example embodiment, the computer device 200 may calculate a numerical value for a performance for a scenario of each service over a plurality of times (the value acquired by dividing the desired (or alternatively, preset) evaluation reference time by the amount of loading time or the value acquired by multiplying the value acquired by dividing the desired (or alternatively, preset) evaluation reference time by the amount of loading time by 100) and then may calculate an average of the calculated numerical values and may index the calculated average.

In operation 350, the computer device 200 may calculate an average of indexed performances measured over a plurality of times. For example, the computer device 200 may calculate a score for a specific scenario five times and may determine an average thereof as a final score for a corresponding performance measurement of the specific scenario. Here, the computer device 200 may exclude a maximum value and/or a minimum value among indexed performances measured over the plurality of times or exclude a value outside a desired (or alternatively, predetermined) distribution and then may calculate an average of indexed performances. Operation 350 may be optionally performed depending on example embodiments.

In operation 360, the computer device 200 may apply a variability of indexed performances measured over the plurality of times to the calculated average. Here, the variability may be calculated based on a standard deviation or kurtosis. For example, the computer device 200 may calculate a final score by subtracting the standard deviation from the average score. As another example, the computer device 200 may calculate an average between the average score and a score according to the standard deviation as the final score. As another example, the computer device 200 may also calculate the final score in the same manner using kurtosis or a score according to kurtosis, instead of using the aforementioned standard deviation or score according to the standard deviation. Operation 360 may be optionally performed when operation 350 is performed.

Figure 4:
FIG. 4 illustrates an example of results of measuring performance for each service and each scenario according to at least one example embodiment.
Figure 4:
Figure 4:
Figure 4:
Figure 4:
Figure 4:
Figure 4:
Figure 4:
Figure 4:
Figure 4:
Figure 4:
Figure 4:
Figure 4:

FIG. 4 illustrates an example of results of measuring performance for each service and each scenario according to at least one example embodiment. FIG. 4 illustrates an example of results of measuring a performance for each of a plurality of scenarios (scenario 1 to scenario 13) with respect to a plurality of services (service A to service G). In a table of FIG. 4, "Platform(s)" may represent an amount of loading time to approach a platform(s) of a corresponding service and "Service(s)" may represent an amount of loading time until a target screen according to a corresponding scenario is loaded. Also, a score refers to a score calculated when an evaluation reference time is set to 2 seconds and the example embodiment herein represents an example in which all are calculated as 100 points when the amount of loading time is less than or equal to the evaluation reference time. Also, a rate of change may represent a rate of change between a score calculated in a previous performance measurement and a score calculated in a current performance measurement. That is, scenario 1 of service A shows that the score calculated in the current performance measurement decreased by −4.5% compared to the score calculated in the previous performance measurement.

Here, images in a shape of sun and cloud may represent three grades (sun, cloud-covered sun, and cloud) according to the range of scores.

Referring to the table of FIG. 4, a user-perceivable performance may be objectively evaluated for each scenario (e.g., each scenario for a transition to a specific screen of a service) through a method and system for evaluating a service experience performance according to the at least one example embodiment and a performance comparison may be performed for each different service accordingly.

Figure 5:
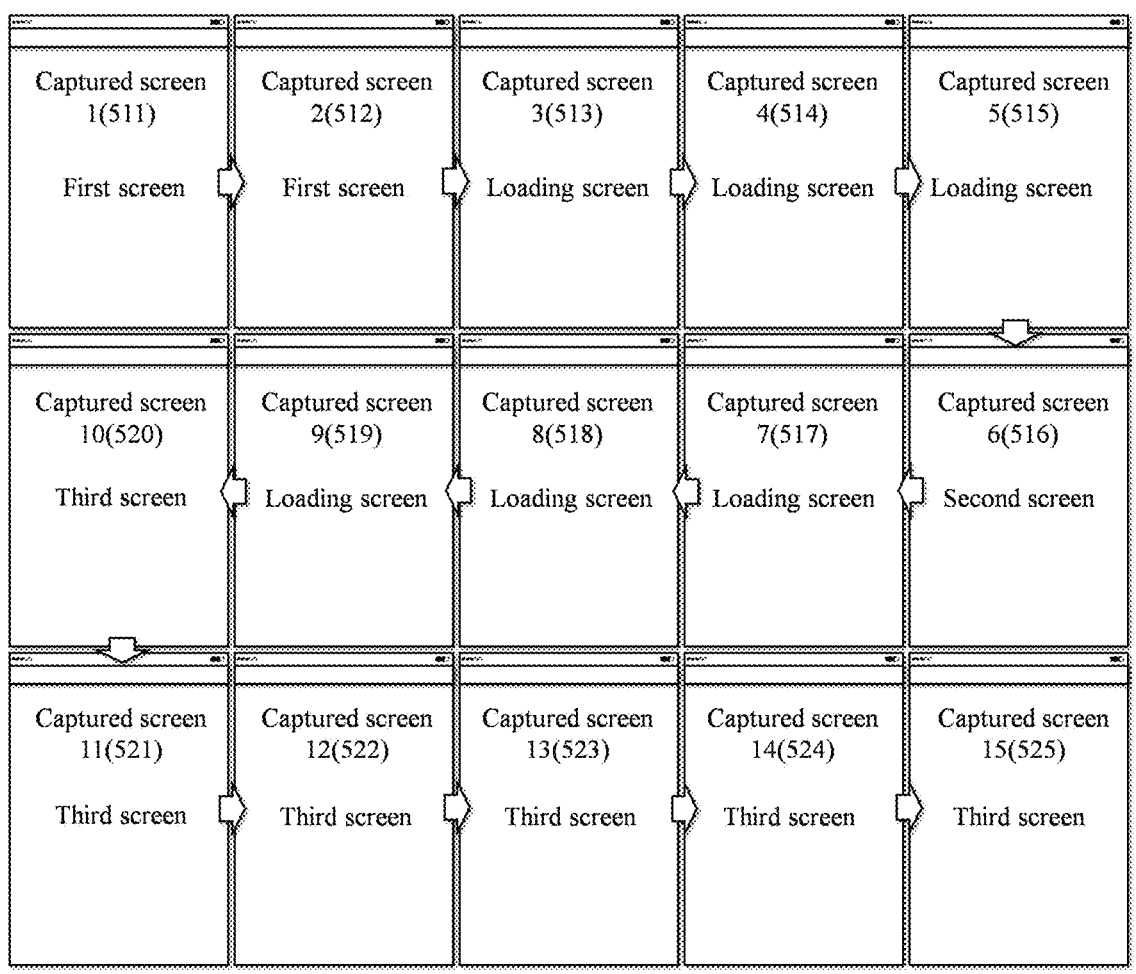
FIG. 5 illustrates an example of captured images according to at least one example embodiment.

FIG. 5 illustrates an example of captured images according to at least one example embodiment. FIG. 5 shows an example of 15 captured screens from a captured screen 1 (511) to a captured screen 15 (525). One of the at least one example embodiment of FIG. 5 may be an example of a scenario for a transition from a first screen to a third screen through a second screen.

If a landing image of a corresponding scenario is set or preset, the computer device 200 may determine a loading completion status of the landing image by comparing each captured screen to the landing image. For example, the computer device 200 may determine that the captured screen 10 (520) is a screen corresponding to the landing image and may determine a loading completion status of the landing image at a point in time at which the screen 10 (520) is captured. Also, the computer device 200 may determine that the captured screen 10 (520) is the screen corresponding to the landing image and may suspend capturing of the screen accordingly.

In another example embodiment, the computer device 200 may compare a change between consecutively captured screens. For example, the computer device 200 may initially compare the captured screen 1 (511) to the captured screen 2 (512) and evaluate a change therebetween, and subsequently may compare the captured screen 2 (512) to the captured screen 3 (513) and evaluate a change therebetween. Here, because there is no change between consecutively captured screens for a desired (or alternatively, preset) period of time due to a continuous comparison between the same screens after the captured screen 10 (520), the computer device 200 may determine that loading of the landing image is completed and may determine a loading completion time of the landing image as a time at which the captured screen 10 (52) is captured. With the assumption that a screen is captured every 100 ms and a desired (or alternatively, preset) period of time is 400 ms, the computer device 200 may verify that loading of the landing image is completed at a point in time at which there is no change in the captured screen 14 (524) compared to the captured screen 13 (523).

Figure 6:
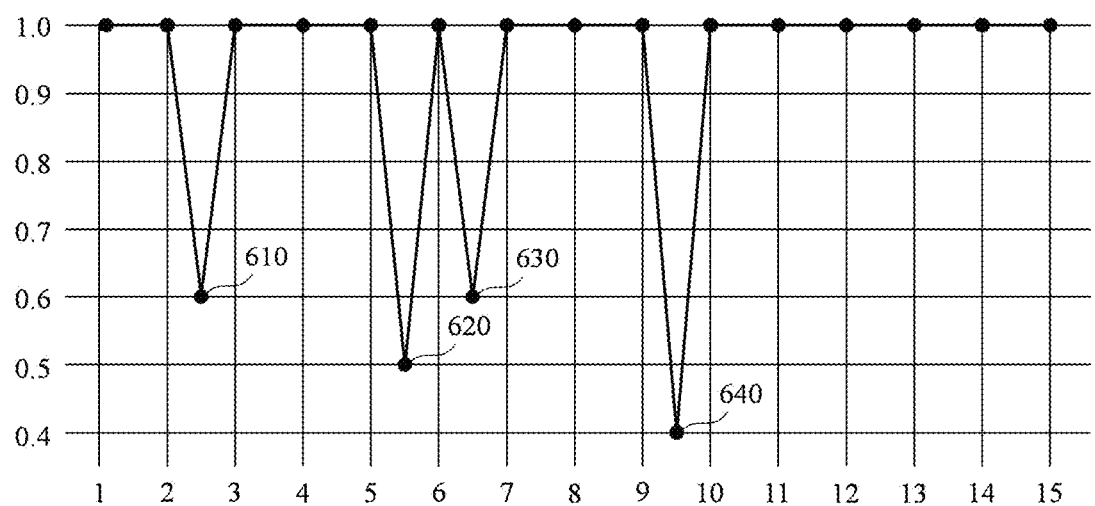
FIG. 6 is a graph showing an example of a change between screens according to at least one example embodiment.

FIG. 6 is a graph showing an example of a change between screens according to at least one example embodiment. The graph of FIG. 6 shows a variance between consecutively captured screens of FIGS. 5. 1 to 15 of the x-axis sequentially represent 15 captured screens, for example, the captured screen 1 (511) to the captured screen 15 (525) of FIG. 15 and the y-axis represents a variance. Here, variance 1 may represent that there is little change and as the variance becomes smaller than 1, it may represent that a variance between screens increases. Here, because there is a change from the first screen to the loading screen between the captured screen 2 (512) and the captured screen 3 (513), a first peak 610 may appear. Also, because there is a change from the loading screen to the second screen between the captured screen 5 (515) and the captured screen 6 (516), a second peak 620 may appear. Also, because there is a change from the second screen to the loading screen between the captured screen 6 (516) and the captured screen 7 (517), a third peak 630 may appear. Because there is a change from the loading screen to the third screen between the captured screen 9 (519) and the captured screen 10 (520), a fourth peak 640 may appear. It can be seen that there is no screen transition after the third screen corresponding to a target screen is loaded and displayed. Therefore, if a period of time without the screen transition is greater than or equal to a desired (or alternatively, preset) period of time, the computer device 200 may determine that loading of the landing image corresponding to the third screen is completed.

As described above, a performance measurement of each scenario of each service may be periodically performed. For example, a performance measurement may be performed for each scenario on a daily basis or a weekly basis. Also, the trend of a performance change based on, for example, a daily basis, a weekly basis, or a monthly basis, may be provided to a manager through a graph and the like.

Also, depending on example embodiments, a performance measured for each scenario may be displayed for a user that desires to use a screen according to a corresponding scenario. For example, a score or a grade for each scenario may be displayed on a screen of the user that requests a transition to a corresponding screen. For example, as a score or a grade for a scenario of a corresponding transition is displayed with a link for a transition to a specific screen, a performance for a screen transition according to a selection on the link may be objectively displayed for users. To this end, an application installed on an electronic device of a specific user may include a function of fetching, from a server, and displaying a score or a grade measured as a performance for a screen transition according to a selection on a corresponding link.

Figure 7:
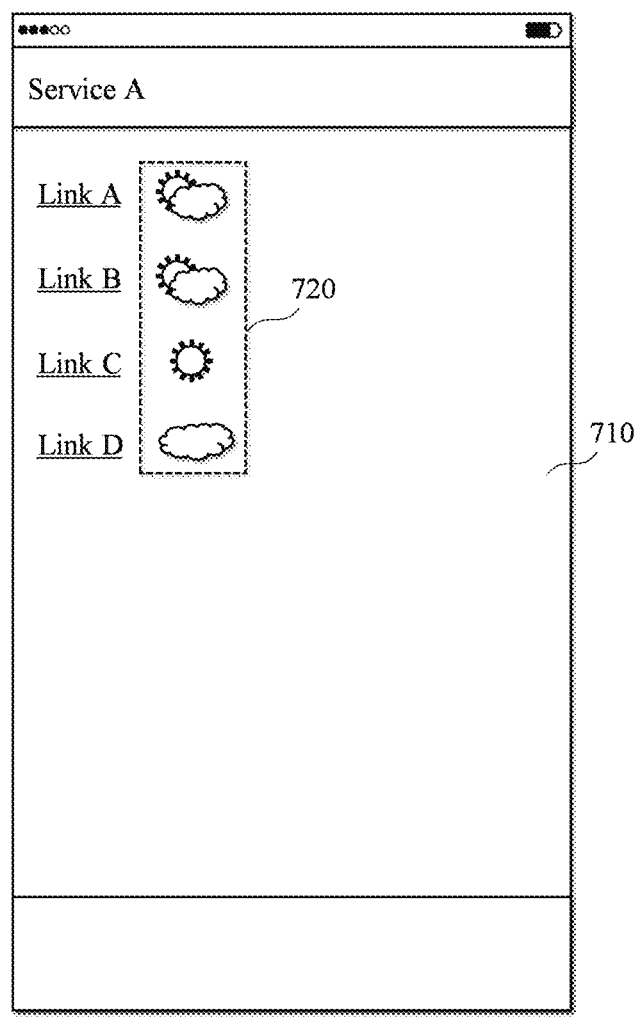
FIG. 7 illustrates an example of showing a performance according to a screen transition according to at least one example embodiment.

FIG. 7 illustrates an example of showing a performance according to a screen transition according to at least one example embodiment. FIG. 7 represents an example in which a specific screen 710 of service A includes a link for a transition from the specific screen 710 to another screen and a performance of each scenario for a transition to a corresponding screen is displayed for each of links as shown in a box 720 indicated with dotted lines. Although FIG. 7 illustrates an example of displaying a performance of a scenario corresponding to each link as an image representing a grade, a score representing the performance of the scenario may be directly displayed depending on example embodiments.

As described above, according to some example embodiments, it is possible to determine a loading completion status of a landing image according to a scenario of a service based on a screen capture, may accurately measure a performance for a part perceived by a user by indexing performance for the scenario of the service based on an amount of loading time until loading of the landing image is completed and a desired (or alternatively, preset) evaluation reference time and to compare a performance between different services. The amount of loading time calculated according to some example embodiments may be more accurate compared to the amount of loading time determined based on an internal message provide from a browser or a system, according to a conventional technique.

According to some example embodiments, a performance for a part actually perceived by the user is measured and indexed in the background and thus it is possible for a user to instantly recognize performance differences between different services. Accordingly, it may be possible to prioritize or optimize the order of loading various services (or screens) in accordance with the calculated amount of loading time or the indexed performance associated therewith.

The systems or the apparatuses described above may be implemented using hardware components, or a combination of hardware components and software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may include, alone or in combination with program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer device, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of the program instructions include a machine language code such as produced by a compiler and an advanced language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A method of evaluating a service experience performance of a computer device comprising at least one processor, the computer device configured to communicate with a server over a network, the method comprising:
by the at least one processor,
in response to an input of an instruction according to a scenario of a service, capturing a screen based on a time unit until a landing image according to the scenario of the service is loaded on the computer device;
determining that loading of the landing image is completed based on the captured screen;
in response to a result of the determining indicating that loading of the landing image has been completed, deriving an amount of loading time until the loading of the landing image is completed based on a difference between a loading completion time and a scenario start time, the loading completion time being a time point at which the loading of the landing image has been completed;
indexing performance for the scenario of the service based on the amount of loading time and an evaluation reference time over a plurality of times to obtain a plurality of indexed performances;
determining an average score of the plurality of indexed performances;
calculating a variability of the plurality of indexed performances over a plurality of times based on a standard deviation; and
determining a final score for the service by subtracting the standard deviation from the average score or calculating an average between the average score and the standard deviation.

2. The method of claim 1, wherein
the scenario includes a scenario for a transition from a first screen of the service to a second screen of the service, and
the landing image includes an image corresponding to the second screen.

3. The method of claim 1, wherein the capturing comprises capturing a displayed screen of an electronic device of a user included in a real user environment.

4. The method of claim 1, wherein the determining includes determining that the loading of the landing image is completed when the captured screen corresponds to a desired landing image.

5. The method of claim 4, wherein the deriving comprises determining a difference between a first time at which the screen corresponding to the desired landing image is captured and a second time at which the scenario of the service starts as the amount of loading time.

6. The method of claim 1, wherein the determining comprises:
evaluating a change between consecutively captured screens; and
determining that the loading of the landing image is completed when the change between the consecutively captured screens is absent for a period of time or more.

7. The method of claim 6, wherein the deriving comprises determining a difference between a first time at which a first screen among the consecutively captured screens without the change is captured and a second time at which the scenario of the service starts, as the amount of loading time.

8. The method of claim 1, wherein the indexing comprises indexing the performance for the scenario of the service based on a value acquired by dividing the evaluation reference time by the amount of loading time.

9. The method of claim 1, wherein the indexing comprises:
   indexing the performance for the scenario of the service based on a value acquired by dividing the evaluation reference time by the amount of loading time; and
   indexing the performance for the scenario of the service by assigning a highest score to the amount of loading time corresponding to the evaluation reference time or less.

10. The method of claim 1, wherein the indexing comprises indexing the performance for the scenario of the service by assigning a grade according to a range of a value acquired by dividing the evaluation reference time by the amount of loading time.

11. The method of claim 1, further comprising:
   calculating, by the at least one processor, an average of indexed performances measured over a plurality of times.

12. A non-transitory computer-readable recording medium comprising instructions that, when executed by a processor, cause a computer device to perform the method of claim 1.

13. A computer device comprising:
   at least one processor configured to execute a computer-readable instruction such that the processor is configured to cause the computer device to,
   in response to an input of an instruction according to a scenario of a service, capture a screen based on a time unit until a landing image according to the scenario of the service is loaded on the computer device,
   determine that loading of the landing image is completed based on the captured screen,
   in response to a result of the determining indicating that loading of the landing image has been completed, derive an amount of loading time until the loading of the landing image is completed based on a difference between a loading completion time and a scenario start time, the loading completion time being a time point at which the loading of the landing image has been completed,
   index performance for the scenario of the service based on the amount of the loading time and an evaluation reference time over a plurality of times to obtain a plurality of indexed performances,
   determine an average score of the plurality of indexed performances;
   calculate a variability of the plurality of indexed performances over a plurality of times based on a standard deviation; and
   determine a final score for the service by subtracting the standard deviation from the average score or calculating an average between the average score and the standard deviation.

14. The computer device of claim 13, wherein the at least one processor is further configured to cause the computer device to capture a displayed screen of an electronic device of a user included in a real user environment.

15. The computer device of claim 13, wherein the at least one processor is further configured to cause the computer device to determine that the loading of the landing image is completed when the captured screen corresponds to a desired landing image.

16. The computer device of claim 13, wherein the at least one processor is further configured to cause the computer device to,
   evaluate a change between consecutively captured screens, and
   determine that the loading of the landing image is completed when the change between the consecutively captured screens is absent for a period of time or more.

17. The computer device of claim 13, wherein the at least one processor is further configured to cause the computer device to index the performance for the scenario of the service based on a value acquired by dividing the evaluation reference time by the amount of the loading time.

* * * * *